Sept. 8, 1953          J. G. FOWLER, JR          2,651,329
                 REPAIR CLAMP STRUCTURE AND METHOD
Filed May 13, 1949                              2 Sheets-Sheet 1

INVENTOR.
JAMES G. FOWLER
BY Lester B. Clark
& Ray L. Smith
ATTORNEYS

Sept. 8, 1953  J. G. FOWLER, JR  2,651,329
REPAIR CLAMP STRUCTURE AND METHOD
Filed May 13, 1949  2 Sheets-Sheet 2

INVENTOR.
JAMES G. FOWLER
BY Lester B. Clark
Ray L. Smith
ATTORNEYS

Patented Sept. 8, 1953

2,651,329

UNITED STATES PATENT OFFICE 2,651,329

REPAIR CLAMP STRUCTURE AND METHOD

James G. Fowler, Jr., Alice, Tex.

Application May 13, 1949, Serial No. 93,043

8 Claims. (Cl. 138—97)

This invention relates to a repair clamp structure and method which has particular application to the rapid repair of fluid lines, as pipe lines, where it may be prohibitive to leave the line shut down for any length of time, and where the fluid in the line may be inflammable.

It is an object of this invention to provide a repair clamp structure and method which is adapted to quickly be applied to repair a leaky line as a pipe line.

It is a further object of this invention to provide a clamp structure and method of this type which is adapted to repair a line in which a section of substantial length may have leaks therein.

It is a further object of this invention to provide a clamp structure and method of this kind which is adapted to repair a line which may have leaks therein between pipe sections and either end of the fitting connecting them.

It is a further object of the invention to provide a clamp structure and method of this class which is adapted to repair a leaky pipe line where the leak may exist between a fitting and one section of pipe which the fitting may connect to another section.

It is still a further object of this invention to provide a clamp structure and method of this class which is adapted to repair a line which may leak between the collars and the pipe at either end of either a long or short line section which the collars connect to the pipe.

It is also an object of this invention to provide a structure and method of this class which is adapted to quickly seal off the fluid in a leaky line to insure against its ignition while the line is repaired by operations requiring torch welding.

Other and further objects of this invention will be apparent when the specification is considered in connection with the drawings, in which.

In present operation, when a line containing fluid, as a pipe line containing gas or oil, begins to leak, not at the collars, but along a length of pipe, the line is shut down, the leaky section is cut away with roller type pipe cutters or by any means not designed to ignite the fluid, and the open ends of the line are plugged, as with mud. Then a repair section of the same length as the section removed is inserted to be butt welded into the line. Where there is fluid leakage through the plugging means, ignition of the fluid by the welding torch most likely occurs with attendant damage to personnel and equipment.

In cases where there is leakage from the fittings, as collars or couplings, which connect sections of the line, it is not necessary to close down the line to repair the leak. However, the present field welding employed in this case is also accompanied by the same inherent dangers as hereinabove described, especially in cases where the leakage from the fitting may be appreciable.

Figure 1:
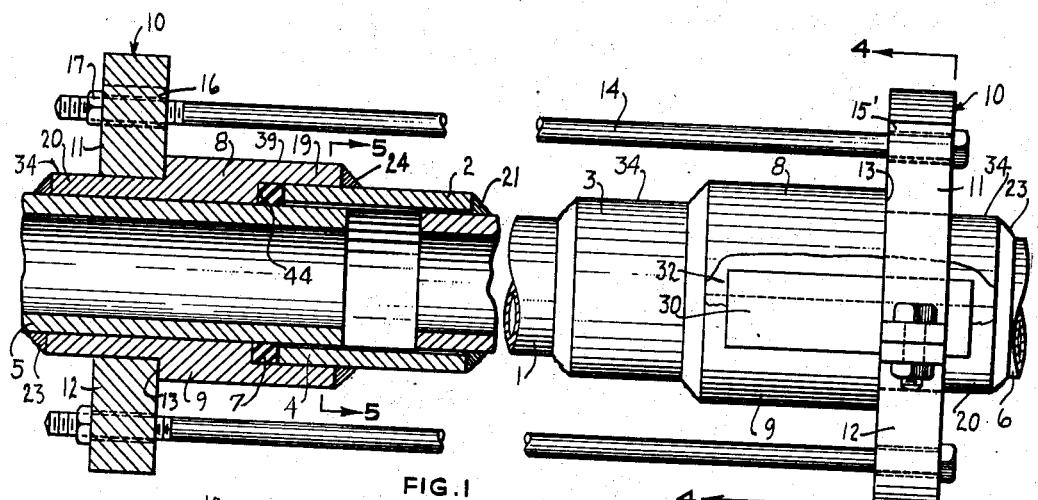
Fig. 1 is an elevation partly in section which shows the structure of this invention employed to repair a line which has a leak over a short length thereof.

In Fig. 1 a section of pipe line, which has leaks therein over a fairly short length, has been cut away as by roller type pipe cutters after the fluid flow in the line has first been shut off. Then a new section of pipe 1 which has been tested for leaks has had end rings 2 and 3 welded thereon and has been fitted in the place of the leaky section so that the end parts 4 of the end rings extend over either end 5 or 6 of the pipe line. Prior to this, seal 7 may be fitted over each pipe line section 5 and 6 or optionally after this such a seal 7 of the split type, or of the continuous ring type, may be fitted around each of these pipe line sections.

Figure 4:
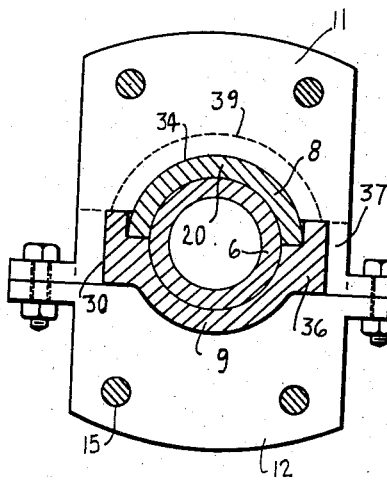
Fig. 4 is a cross sectional elevation taken along the line 4—4 of Figs. 1, 2, and 3.
Figure 8:
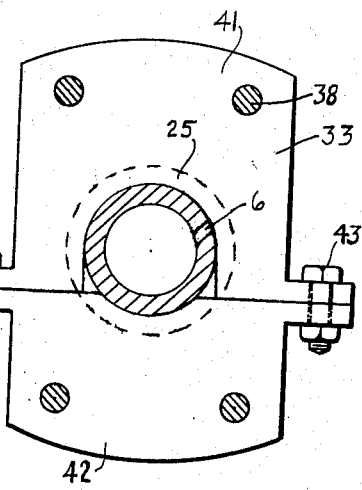
Fig. 8 is a cross sectional elevation taken along line 8—8 of Fig. 3.

After this, welding segments 8 and 9, as shown more clearly in Fig. 4, are interfitted around the pipe sections 5 and 6 and then the clamps 10, which are comprised of the clamp segments 11 and 12, are fitted about each welding segment to bear against the shoulders 13 thereon.

After this, the bolts 14, which are provided of length to conform with the length of the section to be repaired plus the necessary length exceeding this distance, are fitted through the holes 15' and 16 in the clamps, and the nuts 17 are tightened on these bolts to firmly connect the clamps and to compress the seals 7 between the clamps and end ring 2 and to force the over-shoulder 44 and end ring 2 and to force the over-extending sections 19 of the welding segments to a proper position upon the end rings. When this has been accomplished, the ends 20 of the welding segments are welded to the pipe sections 5 and 6. Then the clamps are removed and the over-extending sections 19 are welded to the end rings. There can then be no leakage between the new pipe section 1 and the end rings by virtue of the leakproof welds 21, and there can be no leakage between the pipe sections 5 and 6 and the welding segments 8 and 9 by virtue of the compressed seals 7, the leakproof welds 23, and the leakproof welds 24.

Figure 7:
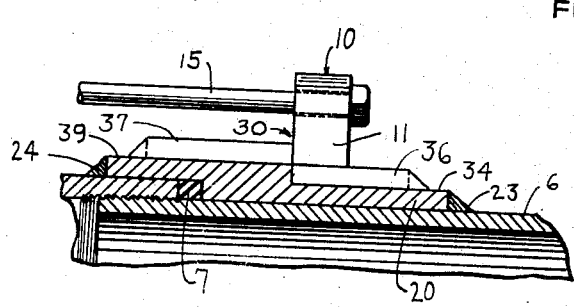
Fig. 7 is a fragmentary sectional elevation taken along line 7—7 of Fig. 2.

After this has been done, the leakproof connection of the repaired line is finally established by welding the weld 32 around each welding lug 30. As shown in Figs. 4 and 7, these lugs 30 constitute parts of each lower welding segment 9, and such lugs overextend the upper clamp segments 8. These welds 32 cover the joints between the welding segments 8 and 9 and extend across each segment from the weld 24 on one end to the weld 23 on the other end.

In cases where there is a leak on either side of a fitting, as a collar 25, which connects two pipe sections 5 and 6, seals 7 are installed around the pipe sections to abut the collar on either end thereof and then welding segments 8 and 9 are provided and interfitted around the pipe sections 5 and 6 to over-extend the collar 25. Then the clamp segments 11 and 12 are bolted together, by bolts 43, to extend around the welding segments 8 and 9, and bolts 15 of desired length are employed to connect the clamps and to firmly compress the seals between the welding segments and the collars.

Then the leak-proof welds 23 are applied to weld the welding segments 8 and 9 to the pipe sections 5 and 6. After this the clamps are removed and then the weld 28 is applied between the ends 19 of the welding segments to complete the weld between these segments and the nipple 25.

Figure 2:
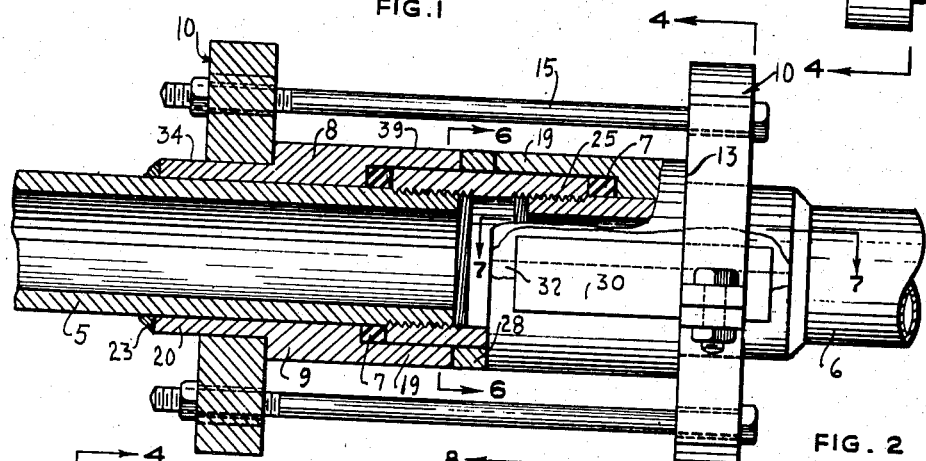
Fig. 2 is an elevation partly in section in which the structure of this invention is employed to repair a line which has leaks between pipe sections and either end of the collar connecting them.

In this respect it is pointed out that in cases where a long collar may have been employed the welds 28 need not extend continuously from one welding segment to another whereas the weld does so extend in the case of a short collar as shown in Fig. 2.

The leak-proof repair is then completed by applying the welds 32 around the welding lugs 30 to connect the upper welding segments 8 and the lower welding segments 9.

Figure 3:
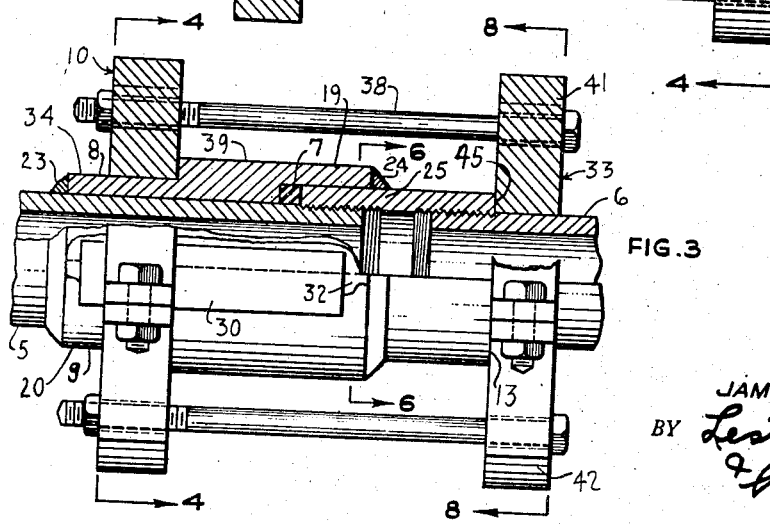
Fig. 3 is an elevation partly in section which shows the structure of this invention employed in repairing a pipe line in which there may be a leak between one side of a collar and one of the pipe sections which the collar connects to another section.
Figure 5:
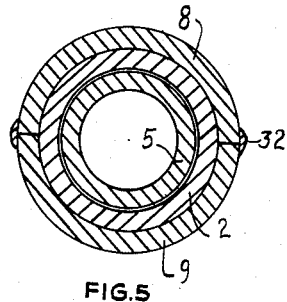
Fig. 5 is a cross sectional elevation taken along line 5—5 of Fig. 1.
Figure 6:
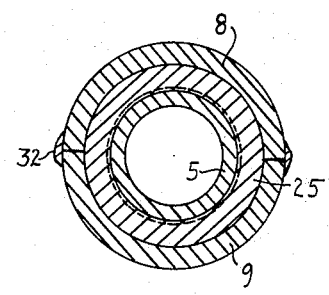
Fig. 6 is a cross sectional elevation taken along line 6—6 of Figs. 2 and 3.

In cases where there may be a leak between only one side of a collar 25 and a pipe section, as the pipe section 5 shown in Fig. 3, the same clamp structure is used as in the above cases but only one welding segment assembly is required and one seal 7. In this case the segments 41 and 42, which comprise the clamp 33, are fitted around the pipe section 6, these segments being of an inner diameter to conform to such pipe section.

After the bolts 38 have been tightened on the clamps to compress the seal 7 and position the welding segments, then the weld 23 is applied to connect the welding segments and the pipe section 5, the clamps are then removed, and the weld 24 applied to connect the welding segments and the collar. After this, the weld 32 is applied around the lug 30; and at this point it may also be desirable to weld around the non-leaky end 45 of the nipple to avoid possible future leakage.

It may also occur that there may be leaks between each of the collars at either end of a short length pipe or nipple and the pipe at either end to which the collars connect the nipple. In this case a welding segment assembly and clamp 10 are provided on the side of each collar outwardly of the nipple, as shown at the left hand side of Fig. 3, and the clamps 10 therefor are connected by bolts, as the bolts 14 of Fig. 1, which join the clamps together. Then the welding proceeds at each end as described hereinabove for the structure of Fig. 3.

Also, it may occur that there may be leaks between each of the collars at either end of a substantial length of pipe and the pipe at either end to which the collar connects the substantial length. Such substantial length may be of the length of one or more standard length pipe sections, or any such length that would make it impractical to use even the long bolts 14 to connect the clamps at either end. In this case the structure and method of Fig. 3 is individually employed to repair the leaky collar at either end of the substantial section.

Fig. 7 shows the particular structure of the welding lugs 30, which are subdivided into two portions 36 and 37, which are incorporated, respectively, upon the larger diameter portion 39 and the smaller diameter portion 34 of each welding segment.

Broadly, this invention considers a repair clamp structure and the methods of use thereof which provides standard welding segments which are adapted to be supplied and left as integral parts of the repaired pipe lines.

What is claimed is:

1. A method of repairing a line having a leaky section therein, comprising the steps of, removing the leaky section from the line, fitting seals around the parts of the line adjacent the interrupted section, inserting a repair section in place of the leaky section having ends to overextend the line end adjacent thereto, placing a pair of semi-tubular welding segments around each end of the line on the side of the seal opposite the interruption to form a sleeve abutting the seal, drawing the sleeves together to compress the seals and to overextend the seal and the repair section at each end of the repair section, welding the outer ends of each pair of welding segments to the line, welding the inner ends of each pair of welding segments to the repair section, and axially welding together the segments of each pair of welding segments.

2. A method of repairing a line which leaks on both sides of a fitting therein, comprising the steps of, fitting seals around the line to abut each end of the fitting, placing a pair of semi-tubular welding segments around the line adjacent each end of the fitting to form a sleeve abutting each seal, drawing the sleeves together to compress the seals and to overextend an end of the fitting, welding the outer ends of each pair of welding segments to the line, welding the inner end of each pair of welding segments to the fitting, and axially welding together the segments of each pair of welding segments.

3. A method of repairing a line which leaks on one side of a fitting therein, comprising the steps of, placing a seal about the line to abut the leaky side of the fitting, placing a pair of semi-tubular welding segments around the line to form a sleeve abutting the seal, drawing the sleeve toward the end of the fitting opposite the seal to compress the seal and to overextend the end of the fitting adjacent the seal, welding the outer ends of the welding segments to the line, and axially welding the welding segments together.

4. A method of repairing a line which leaks on one side of a fitting therein, comprising the steps of, placing a seal about the line to abut the leaky side of the fitting, placing a pair of semi-tubular welding segments around the line to form a sleeve abutting the seal, drawing the sleeve toward the end of the fitting opposite the seal to compress the seal and to overextend the end of the fitting adjacent the seal, welding the outer ends of the welding segments to the line, and axially welding the welding segments together and the non-leaky end of the fitting to the line.

5. In apparatus for connecting pipe sections, the combination of at least one pair of complementary semi-tubular welding segments having a reduced external diameter at one end to form a shoulder and an enlarged inner diameter at the other end, two pairs of complementary semi-tubular clamp segments, at least one pair being connected around a pair of welding segments to bear against said shoulder, and adjustable means for connecting one pair of clamps to the other pair of clamps.

6. In apparatus for connecting pipe sections, the combination of at least one pair of complementary semi-tubular welding segments having a reduced external diameter at one end to form a shoulder and an enlarged inner diameter at the other end to form a seat, two pairs of complementary semi-tubular clamp segments, at least one pair being connected around a pair of welding segments to bear against said shoulder, adjustable means for connecting one pair of clamps to the other pair of clamps, and sealing means within to bear upon said seat of at least one pair of welding segments.

7. A method of repairing a line which leaks on the line engaging side of a fitting at either end of a short, leaky pipe section, comprising the steps of placing a seal about the line to abut the leaky side of each fitting, placing a pair of semi-tubular welding segments around the line adjacent each seal to form a sleeve abutting each seal, drawing the sleeves together to compress the seals and to overextend the end of each fitting adjacent thereto, welding the outer ends of each pair of welding segments to the line, and axially welding the segments of each pair of welding segments to each other.

8. A method of repairing a line which leaks on the line engaging side of a fitting at either end of a short, leaky pipe section, comprising the steps of placing a seal about the line to abut the leaky side of each fitting, placing a pair of semi-tubular welding segments around the line adjacent each seal to form a sleeve abutting each seal, drawing the sleeves together to compress the seals and to overextend the end of each fitting adjacent thereto, welding the outer ends of each pair of welding segments to the line axially, welding the segments of each pair of welding segments to each other and welding the end of each non-leaky pair of welding segments to the fitting in contact therewith.

JAMES G. FOWLER, JR.

References Cited in the file of this patent
UNITED STATES PATENTS

| Number | Name | Date |
|---|---|---|
| 1,851,574 | Fiederlein | Mar. 29, 1932 |
| 2,003,488 | Hook | June 4, 1935 |
| 2,173,109 | Hamblin | Sept. 19, 1939 |
| 2,180,919 | Pool | Nov. 21, 1939 |
| 2,219,085 | Watson | Oct. 22, 1940 |
| 2,258,913 | Stone | Oct. 14, 1941 |
| 2,308,340 | Newlon | Jan. 12, 1943 |
| 2,451,702 | Weigand | Oct. 19, 1948 |
| 2,478,684 | Brooks | Aug. 9, 1949 |